Jan. 7, 1936.  E. W. BLY ET AL  2,027,146
NUT ROASTING MACHINE
Filed Nov. 19, 1934   3 Sheets-Sheet 1
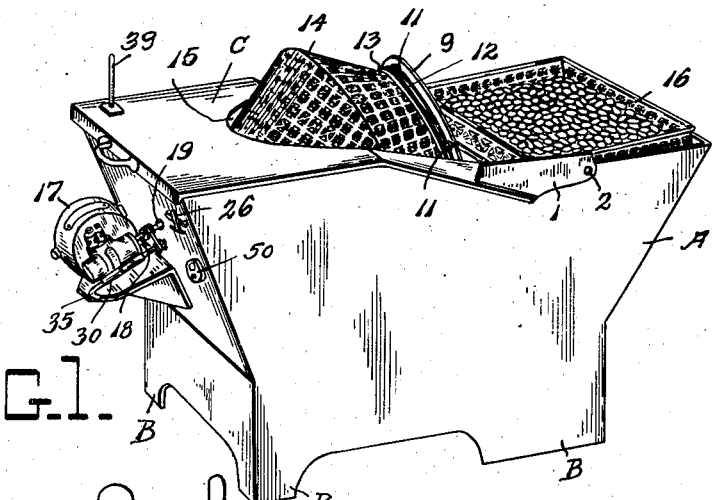
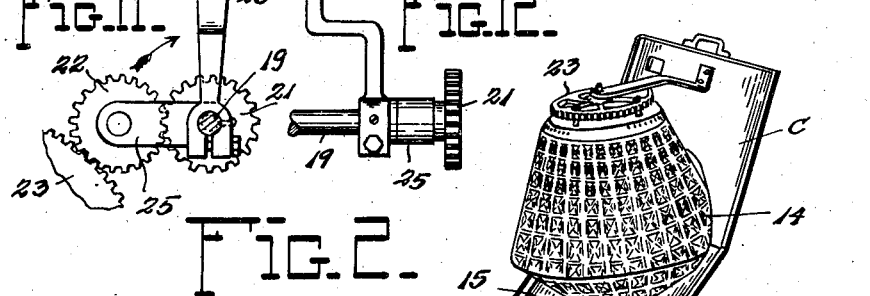
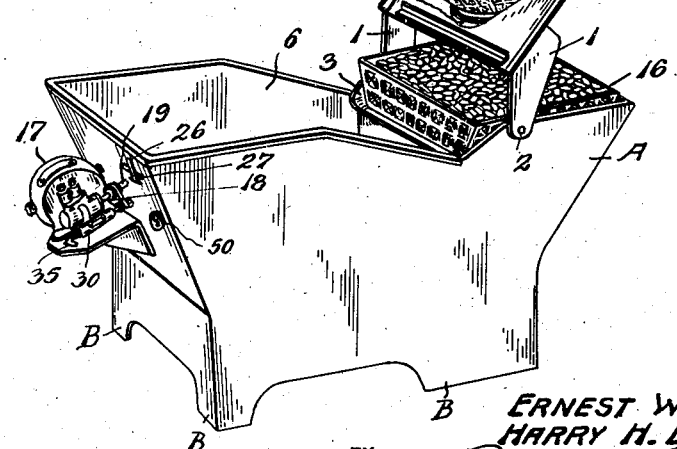
INVENTORS
ERNEST W. BLY.
HARRY H. LUTZY.
BY
ATTORNEYS

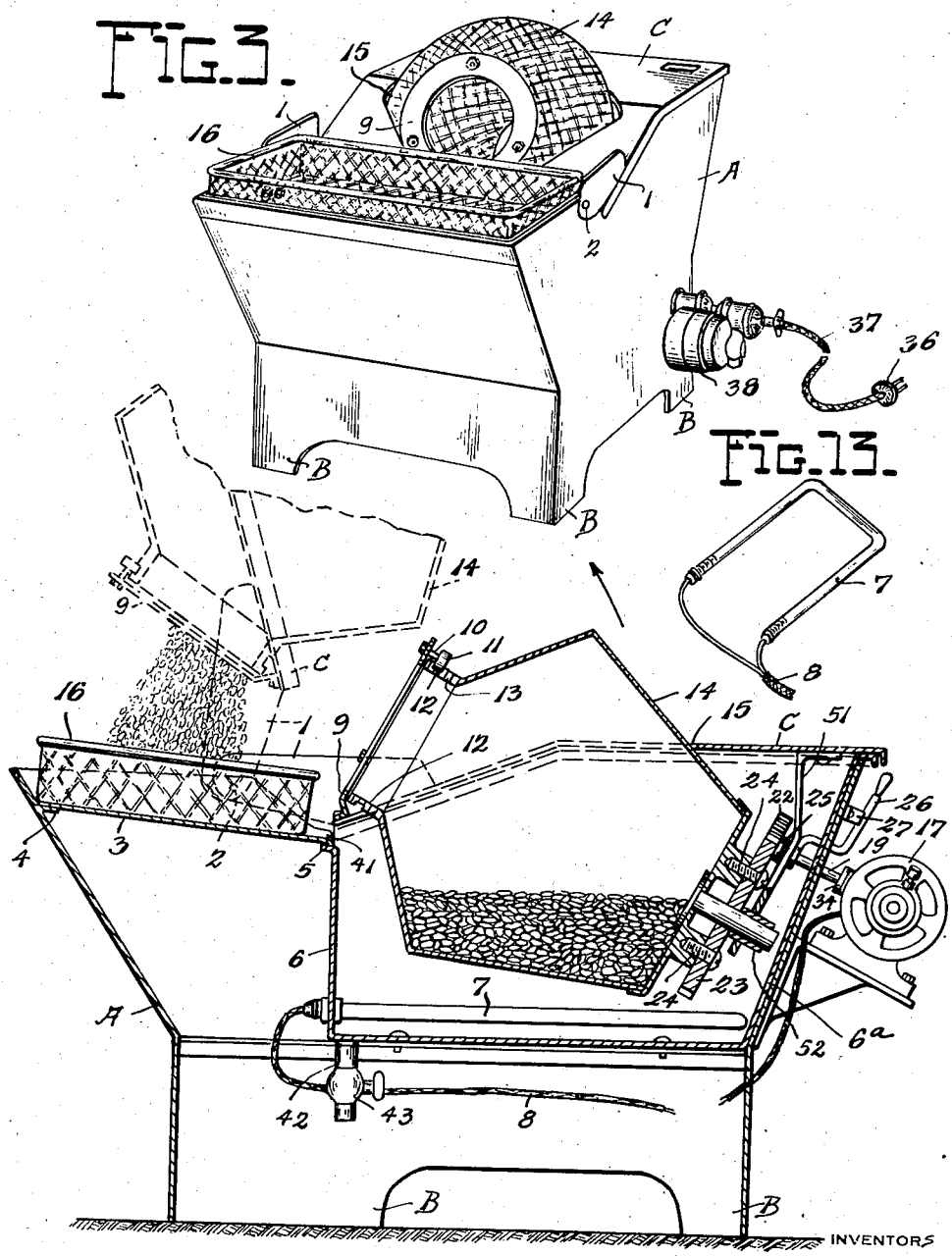

Jan. 7, 1936.　　　　E. W. BLY ET AL　　　　2,027,146
NUT ROASTING MACHINE
Filed Nov. 19, 1934　　　3 Sheets-Sheet 3
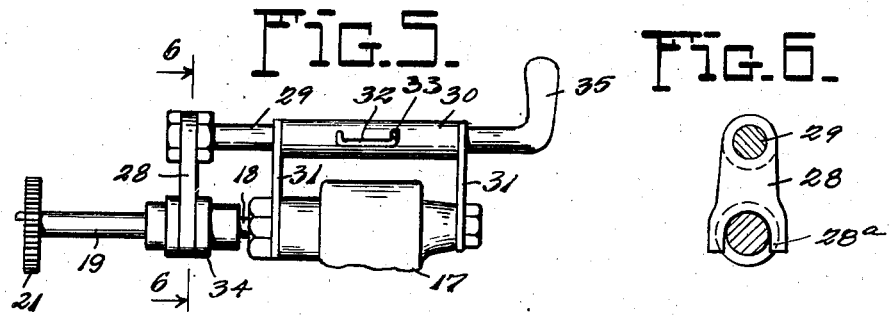
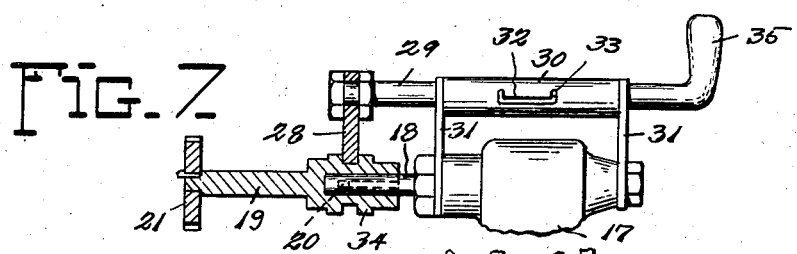
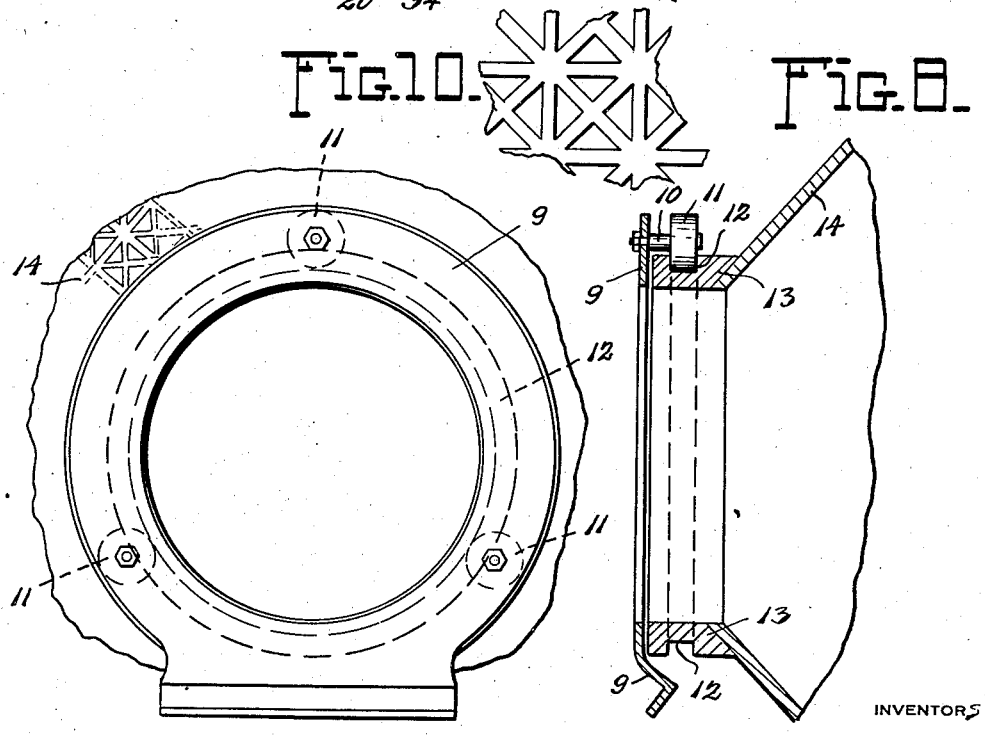
INVENTORS
ERNEST W. BLY.
HARRY H. LUTZY.
BY
ATTORNEYS Patented Jan. 7, 1936

2,027,146

UNITED STATES PATENT OFFICE 2,027,146

NUT ROASTING MACHINE

Ernest W. Bly and Harry H. Lutzy, Cleveland, Ohio

Application November 19, 1934, Serial No. 753,777

16 Claims. (Cl. 53—7)

The purpose of this invention has been to devise a relatively simple, compact, and automatic machine for roasting nuts or nut meats. The operation of treating nut meats for roasting purposes, as it is called in the art, has heretofore commonly been performed by the submersion of the nuts, while contained in a reticulated basket of some kind, in the roasting bath, the latter consisting of hot melted fatty compound such as coconut oil or the equivalent. Necessarily, in order to obtain as nearly uniform treatment of the nuts or nut meats as possible, the attendant in charge of the operation is required to constantly agitate the nuts while submerged in the roasting bath. The foregoing is a time taking operation and not conducive to obtaining uniformity in the various batches of nuts that are handled by the attendant.

The machine of the present invention affords an efficient method of treatment of the nuts in the roasting operation by reason of the fact that it comprises an agitating drum or container driven by power and adapted to receive each batch of nuts to be treated therein, the same to be maintained submerged in the roasting bath by the disposition of the container itself partially submerged in such bath. The container is a drum rotated in order to give the desired agitating movement to its contents, and suitable provisions are employed for maintaining the roasting bath at uniform temperature and for indicating proper uniform roasting periods of time during which the nuts being treated will be maintained under roasting conditions.

Among the special objects of the invention are the provision of a roasting machine, the construction of which admits of constant observation of the roasting process even though constant attention thereto is not required; the employment of a type of construction for the machine such that it will constitute an animated display apparatus suitable to be placed in a store or other display window to attract attention of passers-by for the purpose of enhancing sales; and the provision of such a machine composed of relatively few parts and which may be cheaply manufactured so as to be within the reach of the average small storekeeper, enabling him to produce roasted nuts or nut meats of the uniform roasted quality desired and insuring that the nut meats will be of even color as regards the various successive batches which will be handled by the machine.

In view of the nature of the machine, especially in reference to its automatic action, special provisions must be made whereby to facilitate the movement of the agitating receptacle or drum from its position partially submerged in the roasting bath, with its contents wholly submerged therein, to a position for discharging the contents after the roasting operation has been completed. To this end facilities are provided for shifting the drum from its position accomplishing the roasting operation to a discharge position. Since the agitating drum or receptacle is motor driven, minor provisions included in the invention involve the employment of manipulative gear unmeshing devices and manipulative means for disconnecting sections of the motor driving shaft which actuates the agitating receptacle. The last mentioned feature is required in order to facilitate the removal of the roasting bath container or receptacle, this being desirable when the latter has to be cleaned or emptied as required at intervals between roasting operations.

With the foregoing and other objects in view as will more fully appear as this description proceeds, the accompanying drawings illustrate a preferred embodiment of the invention, though it is to be understood that we do not wish to be limited to the precise construction depicted therein, for the same may be modified in different aspects so far as details of construction are concerned, within the spirit of the following disclosure and the scope of the annexed claims. In the said drawings—

Figure 1 is a perspective view of a nut roasting machine embodying the preferred form of the invention.

Figure 2 is a view in perspective illustrating the operation of discharging the contents of the agitating receptacle by uplifting the cover and causing the nut meats in the agitating drum to discharge into a receiving basket ready to be taken away and packed or displayed for sale.

Figure 3 is a view somewhat similar to Figure 1 but looking at the machine in perspective from an opposite direction.

Figure 4 is a vertical longitudinal sectional view of the machine, dotted lines showing the uplifted or discharge position of the roasting drum, the dotted line illustration, however, being partly broken away.

Figure 5 is a fragmentary detail view showing the instrumentalities utilized for quickly disconnecting the sections of the driving shaft which is directly geared to the driven gear on the agitating drum of the receptacle.

Figure 6 is a sectional view on the line 6—6 of Figure 5.

Figure 7 is a view similar to Figure 5 but showing the shaft sections in section to more clearly bring out the method of separating said sections.

Figure 8 is a partial sectional view showing more clearly the upper mounting means between the cover and the agitating drum.

Figure 9 is a view partly broken away looking toward the open end of the agitating drum and showing more fully the location of the supporting rollers which afford a rotative mounting for said drum in a cradle carried by the cover.

Figure 10 is an enlarged fragmentary view showing the method of aperturing the drum.

Figures 11 and 12 are detail views in end and side elevation illustrating more fully the driving gears, swinging lever, and arm parts by which the gear is adapted to be disconnected from the adjacent driven gear.

Referring to Figures 1 and 2 of the drawings for example, it will be noted that our machine includes a casing A, the lower portion of which is formed to provide supporting legs or feet B. At the upper portion thereof the casing A is equipped with the cover C, the said cover being pivotally attached by brackets 1, as shown at 2, to an upper end portion of the casing A. This end portion of the casing A connected with the cover C is inclined outwardly and receives in its upper open portion a supporting and drip pan 3. The said pan 3 is supported at its outermost portion on a ledge 4 at the discharge end of the casing A and additionally supported at its inner end on an offstanding flange or ledge 5 of the roasting bath container or receptacle 6. The receptacle 6 is of relatively large area and is adapted to contain the melted coconut oil or similar bath in which the nut meats are to be roasted, the said bath preferably occupying approximately half the depth of the receptacle 6. The end of the receptacle 6 adjacent to the pan 3 may be substantially vertical, whereas its opposite end 6a is inclined to conform with the inclination of the end of the casing A opposite that at which the nut meats are discharged from their agitating container or drum, to be shortly described.

Any suitable means may be used to heat the roasting bath in the receptacle 6, the means shown comprising an enclosed heat unit 7 which may take the form illustrated in Figure 13, being preferably of the electrical type connected up with a main line circuit by the wires 8.

The agitating container for the nut meats is mounted upon the cover C, and to facilitate such mounting the latter is equipped with an upwardly inclined cradle 9 adjacent to the pivot brackets 1 aforesaid. The cradle 9 comprises an approximately circular plate equipped with small shafts 10 carrying supporting rollers 11, these supporting rollers engaging in an annular groove 12 formed in the discharge end 13 of the agitating drum or container 14. The container 14 is thus rotatably carried upon and supported by the cradle 9 which is rigid with the cover C, so that movement of the cover C is adapted to impart corresponding movement to the container 14.

Now the agitating container or drum 14 is mounted peculiarly upon the cover C for a twofold purpose, namely, in order that the container may project through an opening 15 in the cover C sufficiently that the upper portion of the container is visible so that its rotative movement is apparent to a person looking at the machine, thereby affording an animated display apparatus tending to attract the attention of passers-by when the machine is disposed in a window or on a counter or in some similar place accessible to the public. In the second place, the container 14 is carried by the cover C in order that the cover C may afford a means of moving the container from its normal operative position, in which it receives and contains the nut meats and causes them to be submerged in the bath in the receptacle 6, to a position wherein the cover C is upraised as shown in Figure 2 and the container 14 carried to a position wherein its contents will be discharged into a basket 16 supported on the pan 3 at the discharge end of the casing A. The container or agitator 14 is preferably in the form of a drum large at the intermediate portion and tapering toward its opposite ends after the manner of a double cone structure. This is a desirable form for facilitating the introduction and the emptying of the contents of the said agitator.

For driving the container or agitator 14 in its rotative movement, there is employed a motor 17, see Figures 1, 2, and 4, said motor being equipped with a suitable driving shaft made up of driving section 18 and a driven section 19, see Figure 7, the section 18 telescoping within the section 19 and being drivably connected therewith by a key or spline 20 which permits the sliding of the section 19 off of the section 18 for purposes to be hereinafter described. The section 19 of the shaft is equipped with a pinion 21 keyed thereto and meshing with a second pinion 22, see Figure 11, the latter in turn meshing with a driven gear 23 which is secured in any substantial manner, as by screws 24, to the closed end of the drum 14. The pinion 22 is supported by an arm 25 carried by the shaft 19 and adapted to turn on said shaft under the actuation of a lever 26, see Figures 11 and 12. The purpose of this arrangement is to permit the operator to quickly shift the lever 26 laterally in order to rock the arm 25 upwardly and carry the pinion 22 out of mesh with the gear 23. Thereupon, the cover C may be readily lifted so as to carry with it upwardly the drum 14 to shift the drum from its operating or rotating position into the partially dotted line position of Figure 4 or the full line position of Figure 2, wherein its contents will be discharged into the receiving basket 16.

The lever 26 may be held in its position maintaining the pinion 22 engaged with the gear 23 by any suitable kind of detent 27 as shown in Figure 4.

Under certain conditions it is desirable to remove the roasting bath receptacle 6 from within the casing A, as for the purpose of repairing the heating unit 7 under which conditions manipulative devices as illustrated in Figures 5 to 7 inclusive are utilized to facilitate such operation. These devices include a yoke 28 carried by a slide member 29 mounted in a sleeve bearing 30 supported by vertical brackets 31 offstanding from the motor unit 17. The sleeve bearing 30 has a double-bayonet slot 32, and the slide member 29 has a pin 33 operating in said slot. The yoke 28 has a bifurcated portion 28a engaging a grooved hub 34 which is an integral portion of the inner end of the shaft section 19. At its outer end the slide member 29 has a handle 35.

By grasping the handle 35 and turning the slide member 29 slightly, the pin 33 may be disengaged from the locking outer end of the bayonet slot 32 and the slide member 29 moved toward the casing A to thereby push the shaft section 19 off of the shaft section 18. When the shaft section 19 and its gear 21 are thus dislodged, and since the part 19 passes through an opening in the end of the casing A and the adjacent end 6a of the receptacle 6, the interlock between the parts 6a and A caused by the shaft section 19 will be incapacitated and the receptacle and adjacent parts in the casing may be removed. Of course, in this operation the receiving basket 16 would first be displaced, the pan 3 removed, the cover C upraised after the lever 26 has been actuated to shift the pinion 22 away from the gear 23, and the shaft section 19 will have been displaced from the section 18 previous to the lifting out of the receptacle 6.

The operation of the machine or apparatus of this invention is relatively simple and may be summarized as follows:

Assuming the parts to be in the positions of Figure 4 in full lines, the motor 17 will be driven by connecting the plug 36 of the electric wire 37 into a main line socket, the current being thus supplied to the heater 7 and to the motor. A suitable switch, not shown, may be included in the electric connection 37. For causing the motor to operate, a switch 38 may be availed of. Of course, preliminarily the heater 7 is utilized to bring the coconut oil or other roasting bath in the receptacle 6 to its proper temperature. The temperature is determined by a thermometer 39 adapted to be introduced into the bath in the receptacle 6 through an opening in the cover C as shown in Figure 1. With the roasting bath at proper temperature the nut meats are introduced into the drum 14 and the drum partially submerged in the bath of the receptacle 6 by closing down the cover C as shown in Figure 4. A suitable timing means 50 of an electrical nature may be employed for timing the period in which the nut meats should be maintained in the roasting bath. By turning on the switch 38 the drum 14 rotates under the actuation of the motor 17 and constantly agitates the nut meats so as to cause them to be roasted in an even, uniform manner. If the timing means is automatic, a signal may be flashed to the operator to indicate when the roasting operation is complete. Such a timing means may be adjustable to suit different conditions as when different kinds of nut meats are being roasted. The roasting operation being completed, all the operator has to do to discharge the contents of the drum 14 is to grasp the handle 40, see Figure 2, and raise the cover C to the position illustrated in said figure. The nut meats will then discharge through the open end of the drum 14 into the basket 16 and the drippings of the roasting bath will pass through the apertures of the basket 16 and drip back into the receptacle 6 by passing downwardly over the bottom of the pan 3 through a drip opening 41 at the inner end of the pan and above the ledge 5, into the receptacle 6. For draining the roasting bath from the receptacle 6, a drain pipe 42 and controlling drain cock 43 are utilized.

The agitating drum 14 will be provided of a foraminous or perforated construction so that during its rotation the hot roasting bath will be free to enter the drum and circulate fully around the nut meats as they are agitated within the drum during the rotation of the latter. In this way a very even or uniform roasting treatment of the nut meats is obtained. If desired, the foraminous structure of the drum may be so made as to be ornamental to enhance the attractiveness of the machine as a display in windows or the like. The cover C is provided with a depending bracket 51 having a bearing 52 to receive a journalling trunnion at the closed end of the receptacle 14.

Having thus described our invention, what we claim as new and desire to secure by Letters Patent of the United States, is—

1. In a roasting machine of the class described, in combination, a casing, a roasting bath receptacle in said casing, an apertured agitating drum for containing nut meats to be treated, normally disposed so as to be partially submerged in the bath in said receptacle, instrumentalities whereby said drum may be moved out of the said receptacle to effect discharge of its contents, and driving mechanism connected with one end of the drum for rotation thereof, the other end of the drum being open to provide a discharge, the movement of the agitating drum out of the receptacle as aforesaid being such that the roasted nut meats will be discharged through the open end of the drum by reason of such movement.

2. In a roasting machine of the class described, in combination, a casing, a roasting bath receptacle in said casing, an apertured agitating drum for containing nut meats to be treated, normally disposed so as to be partially submerged in the bath in said receptacle, instrumentalities whereby said drum may be moved out of the said receptacle with a combined elevating and endwise tilting motion to effect discharge of its contents, and driving mechanism connected with one end of the drum for rotation thereof, the other end of the drum being open to provide a discharge, said driving mechanism including a motor, and gearing intermediate said motor and the closed end of the drum, together with manipulative means to adjust said gearing for permitting movement of the drum to a discharge position.

3. In a roasting machine of the class described, in combination, a casing, a roasting bath receptacle in said casing, an apertured agitating drum for containing nut meats to be treated, normally disposed so as to be partially submerged in the bath in said receptacle, and instrumentalities whereby said drum may be moved out of the said receptacle to effect discharge of its contents, comprising a movable cover for said receptacle constituting a supporting carrier for the agitating drum, whereby movement of the cover produces a dumping action respecting the contents of the drum.

4. In a roasting machine of the class described, in combination, a casing, a roasting bath receptacle in said casing, an apertured agitating drum for containing nut meats to be treated, normally disposed so as to be partially submerged in the bath in said receptacle, and instrumentalities whereby said drum may be moved out of the said receptacle to effect discharge of its contents, comprising a movable cover for said receptacle constituting a cover for the casing also, said cover serving to support for the casing also, said cover serving to support said drum and having an opening through which a portion of the drum projects so that said portion is visible during agitating movement of the drum.

5. In a roasting machine of the class described, in combination, a roasting bath receptacle, a cover therefor, an agitating drum of foraminous construction mounted on said cover and adapted to be partially submerged in the bath in said receptacle, and instrumentalities for imparting agitating movement to said drum, the drum being provided with a discharge at one end and the cover being movable to a position to elevate the drum and cause discharge of its contents through said discharge.

6. In a roasting machine of the class described, in combination, a roasting bath receptacle, a cover therefor, an agitating drum of foraminous construction mounted on said cover and adapted to be partially submerged in the bath in said receptacle, and instrumentalities for imparting agitating movement to said drum, the drum being provided with a discharge at one end and the cover being movable to a position to elevate the drum and cause discharge of its contents through said discharge, the said cover having an opening through which a substantial portion of the agitating drum projects and is visible during its agitating movement.

7. In a roasting machine of the class described, in combination, a roasting bath receptacle, a cover therefor, an agitating drum of foraminous construction mounted on said cover and adapted to be partially submerged in the bath in said receptacle, instrumentalities for imparting agitating movement to said drum, the drum being provided with a discharge at one end and the cover being movable to a position to elevate the drum and cause discharge of its contents through said discharge, and a casing in which said roasting bath receptacle is disposed and having a drip pan adjacent to the discharge end of the drum, movement of the cover carrying with it the drum being adapted to shift the discharge opening of the drum to a position above said drip pan.

8. In a roasting machine of the class described, in combination, a roasting bath receptacle, a cover therefor, an agitating drum of foraminous construction mounted on said cover and adapted to be partially submerged in the bath in said receptacle, and instrumentalities for imparting agitating movement to said drum, the drum being provided with a discharge at one end and the cover being movable to a position to elevate the drum and cause discharge of its contents through said discharge, said instrumentalities including a motor carried by the casing, driving connections intermediate the said motor and the drum, and means for shifting certain of the driving connection parts to an inoperative position to permit the drum to be moved to discharge position.

9. In a roasting machine of the class described, in combination, a roasting bath receptacle, a cover therefor, an agitating drum of foraminous construction mounted on said cover and adapted to be partially submerged in the bath in said receptacle, instrumentalities for imparting agitating movement to said drum, the drum being provided with a discharge at one end and the cover being movable to a position to elevate the drum and cause discharge of its contents through said discharge, said instrumentalities including a motor carried by the casing, driving connections intermediate the said motor and the drum, the said driving connections including a sectional shaft extending from the motor at a point exterior to the casing through the casing and bath receptacle to the driving parts attached to the drum, and means for shifting one of the sections of the shaft to disconnect the same from that directly connected with the motor, whereby to facilitate removal of the roasting bath receptacle for purposes of repair or the like.

10. In a roasting machine of the class described, in combination, a roasting bath receptacle, a cover therefor, an agitating drum of foraminous construction mounted on said cover and adapted to be partially submerged in the bath in said receptacle, instrumentalities for imparting agitating movement to said drum, the drum being provided with a discharge at one end and the cover being movable to a position to elevate the drum and cause discharge of its contents through said discharge, said instrumentalities including a motor carried by the casing, driving connections intermediate the said motor and the drum, the said driving connections including a sectional shaft extending from the motor at a point exterior to the casing through the casing and bath receptacle to the driving parts attached to the drum, and means for shifting one of the sections of the shaft to disconnect the same from that directly connected with the motor, whereby to facilitate removal of the roasting bath receptacle for purposes of repair or the like, said driving connections including gearing, and a manipulative device for shifting a part of said gearing to carry the same to a position permitting the agitating drum to be moved to discharge position.

11. In a roasting machine of the class described, in combination, a roasting bath receptacle, a cover therefor, an agitating drum of foraminous construction mounted on said cover and adapted to be partially submerged in the bath in said receptacle, instrumentalities for imparting agitating movement to said drum, the drum being provided with a discharge at one end and the cover being movable to a position to elevate the drum and cause discharge of its contents through said discharge, said instrumentalities including a motor carried by the casing, driving connections intermediate the said motor and the drum, the said driving connections including a sectional shaft extending from the motor at a point exterior to the casing through the casing and bath receptacle to the driving parts attached to the drum, and means for shifting one of the sections of the shaft to disconnect the same from that directly connected with the motor, whereby to facilitate removal of the roasting bath receptacle for purposes of repair or the like, comprising a handle member, and a yoke operable by said handle member to bodily detach the said section of the shaft which is shiftable to disconnect it from the other section directly connected to the motor.

12. In a roasting machine of the class described, in combination, a roasting bath receptacle, a cover therefor, an agitating receptacle having means permitting the introduction of nut meats and the like into and discharge of the same therefrom, and a cradle on the cover for rotatively supporting the agitating receptacle to move with the cover and for movement relatively to the cover thereon, the cover being shiftable to an open position whereby to cause discharge of said agitating receptacle.

13. In a roasting machine of the class described, in combination, a roasting bath receptacle, a cover therefor, an agitating receptacle, and a cradle on the cover for rotatively supporting the agitating receptacle to move with the cover and for movement relatively to the cover thereon, the cover being shiftable to an open position whereby to cause discharge of said agitating receptacle, the said agitating receptacle being open at one end to form a discharge, and the said cradle comprising a ring-like supporting bracket having an opening coincident with the discharge opening of the agitating receptacle, and roller means on said ring-like supporting bracket, the discharge portion of the agitating receptacle having a grooved track in which said roller means operate.

14. In a roasting machine of the class described, in combination, a roasting bath receptacle, a cover therefor, an agitating receptacle, a cradle on the cover for rotatively supporting the agitating receptacle to move with the cover and for movement relatively to the cover thereon, the cover being shiftable to an open position whereby to cause discharge of said agitating receptacle, the cover having an opening through which a substantial portion of the agitating receptacle projects so as to be visible during rotation, a drip pan at one end of the roasting bath receptacle, and pivotal supporting means for the agitating receptacle such that when the cover supporting same is lifted, the discharge thereof will be carried to a position above the said drip pan, said drip pan having communication with the roasting bath receptacle.

15. In a roasting machine of the class described, in combination, a roasting bath receptacle, a cover therefor having an opening therein, a rotative agitating drum of foraminous material disposed on the cover so that its lower portion may normally move in a zone submerged in the roasting bath receptacle whilst the upper portion of the said agitating drum will project through the opening in the cover and be visible to onlookers, a cradle on the cover, a friction bearing means between the cradle and the drum permitting rotation of the drum in the cradle, and handle means for the cover to facilitate opening the same, whereby the agitating drum is carried upwardly and laterally, said drum having a discharge at one end, and pivot brackets supporting the cover in a pivotal manner to enable the above mentioned movement of the drum with the cover in shifting to a discharge position and in moving to a position in which the drum is partially submerged in the roasting bath of the roasting receptacle.

16. In a roasting machine of the class described, in combination, a roasting bath receptacle, an agitating drum of foraminous construction having means permitting the introduction of nut meats and the like into and discharge of the same therefrom, means for rotatably supporting said drum, said means being adapted to dispose the drum in a partially submerged condition in the roasting bath in the receptacle, and also adapted to elevate the drum for discharge of its contents while so rotatably supported, and means for rotating the drum when partially submerged and while supported by the supporting means as aforesaid.

ERNEST W. BLY.
HARRY H. LUTZY.